United States Patent [19]

Espelage

[11] 4,399,395

[45] Aug. 16, 1983

[54] LINE-TO-LINE VOLTAGE RECONSTRUCTION FOR SYNCHRONIZING THYRISTOR POWER CONVERTER

[75] Inventor: Paul M. Espelage, Salem, Va.

[73] Assignee: General Electric Company, Salem, Va.

[21] Appl. No.: 300,200

[22] Filed: Sep. 8, 1981

[51] Int. Cl.³ .............................................. H02P 7/62
[52] U.S. Cl. ..................................... 318/803; 363/37; 363/87; 363/96; 363/129
[58] Field of Search .................... 363/34, 35, 37, 87, 363/96, 129; 318/803

[56] References Cited

U.S. PATENT DOCUMENTS

| | | | |
|---|---|---|---|
| 3,648,148 | 3/1972 | Bechet et al. | 363/35 |
| 4,050,007 | 9/1977 | Gross | 363/87 |
| 4,272,814 | 6/1981 | Nakrokhin et al. | 363/129 |
| 4,347,562 | 8/1982 | Galloway | 363/87 |

OTHER PUBLICATIONS

IEEE Transactions on Industrial Electronics and Control Instrumentation, vol. IECI-26, No. 3, pp. 185-191, Aug. 1979.

*Primary Examiner*—William H. Beha, Jr.
*Attorney, Agent, or Firm*—Arnold E. Renner; Ormand R. Austin

[57] ABSTRACT

The effect of commutation notches 35 appearing in the nominally sinusoidal alternating current (AC) line-to-line voltage, for example, $v_{ab}$ used to synchronize the firing of thyristors in three phase, phase-locked power converters 12 and 14 is essentially eliminated by reconstructing the corrupted line-to-line voltage by summing the integral of the corrupted line-to-line voltage $\Psi_{ab}$ with a signal proportional to the product of the delta load current, for example, $i_{ab}$ and the commutation inductance $L_c$. The composite waveform $\Psi_{ab}+i_{ab}\times L_c$) resulting from the summation has well defined zero crossings 41 from which synchronizing pulses are generated for synchronizing the phase-locked thyristor firing circuit 18 implemented by either software or hardware techniques. Additionally, the reconstructed waveform is used to control commutation, particularly in the control of a load side converter i.e. inverter 14 which is utilized in an AC motor drive system.

30 Claims, 8 Drawing Figures

LINE-TO-LINE VOLTAGE RECONSTRUCTION FOR SYNCHRONIZING THYRISTOR POWER CONVERTER

BACKGROUND OF THE INVENTION

The present invention relates generally to firing circuits for thyristor power conversion systems and more particularly to an improved circuit for controlling the operation of the power conversion system which supplies an electrical load such as an AC motor from a polyphase alternating current source.

Many circuits and systems exist for controlling the conductivity of controlled rectifiers utilized in various types of converters for supplying electrical power to a load from a polyphase alternating current (AC) source. The type of rectifier used will, of course, control to some degree the type of control utilized, but by far the most common controlled rectifier used today is a thyristor of the silicon controlled rectifier type. The thyristor becomes conductive with the simultaneous application of a forward bias voltage and a signal applied to its gate electrode and remains conductive until the anode current falls below the value required to hold the thyristor in the conductive state.

In any polyphase converter system, each phase carries all the current for a portion of the time. For example, in a three phase system, each phase carries all the current for one third of the time with the transfer from phase to phase being accomplished by a well known process commonly referred to as commutation. When the alternating current source applying the thyristor bridge has significant inductance, the commutation of the current from phase to phase takes both voltage and time and accordingly, during commutation process, two phases become shorted for the time it takes to commutate the line current from the outgoing phase to the oncoming phase. The duration of this short circuit is related to the commutation inductance (the inductance of the source supplying the bridge) and the amplitude of the current being commutated. As a result the nominally sinusoidal AC line-to-line voltage becomes corrupted by what is commonly referred to as commutation notches which are periods of zero voltage each time a new thyristor is fired or six times the fundamental line frequency for a conventional six pulse thyristor bridge.

In a phase control system, whether it be an analog or digital control system, the AC terminal voltage is a prime feedback signal employed for the thyristor bridge control. Typically, the AC and DC terminal voltages, referenced to a fictitious neutral, are coupled from the high voltage thyristor bridge through a high impedance resistor attenuator string into differential amplifiers in the control circuitry and to other related circuitry to further derive various signals for a variety of purposes such as thyristor state detectors and voltage regulation. The principal use of the terminal voltage, however, is in a phase-locked loop firing control circuit wherein synchronizing signals are generated from processed line voltages typically involving the integration of the AC line-to-line voltage. In such applications, the zero voltage commutation notches appearing in the line-to-line voltages generate flat spots in the integrated output voltage with the positioning of the notches being dependent on the actual firing angle and their duration which is dependent on the line current and the inductance in the commutation path. Typically, the zero crossings of the integrated line-to-line voltages are determined by comparators and the digital comparison for each phase are combined to form a six times line frequency synchronizing pulse train. Since the aforementioned flat spots can occur at the integrated voltage zero crossings, the stability of the phase lock loop can be undesirably affected. To overcome this undesirable occurrence, known prior art practice has resorted to reconstructing the line-to-line voltage waveform by, in effect, filling up the commutation notches by a method of superposition involving summing the corrupted line-to-line voltage with a signal proportional to the commutating inductance multiplied by the derivative of a fictitious "delta" current which is derived by taking the difference between actual line currents in a well known manner and as more fully described later. The resultant or composite sine wave voltage is thereafter integrated and utilized as a primary feedback control signal for synchronizing either a fixed frequency source side converter or variable frequency load side converter or both.

With respect to a load side converter for a three phase (3φ) AC motor drive, the line-to-line voltage comprises the back electromotive force (emf) which when integrated approximates a pseudo motor flux wave which is expressed in units of volt-seconds. Control of the load side converter furthermore is usually based upon the desire to fire (i.e. to render conductive) the converter as late as possible, i.e. at a power factor angle just sufficiently leading to provide the volt-seconds necessary to safely commutate the outgoing thyristor, according to the expression:

$E \Delta t = L \Delta i$; wherein:
E = source voltage,
$\Delta t$ = commutation time,
L = commutation inductance,
$\Delta i$ = current being commutated.

Accordingly, accurate "flux wave" zero crossings and maximum amplitude information are required in the load side converter to maintain stable and accurate phase locked loop operation, commutation and speed regulation. While filling up the commutation notches in the feedback signal by a summation with the appropriate Ldi/dt signal has heretofore been utilized to reconstruct the voltage signal it requires a differentiation of the motor currents. The network required to implement the differentiation, however, must be followed by a higher frequency lag circuit to eliminate noise in the control loop and thus unduly complicates the system. It is to this problem that the present invention is directed.

It should also be pointed out that whereas motor control systems employing controllable rectifiers hereinafter referred to as thyristors, have been implemented using analog control devices, more recent attention has been directed to digital type of control systems, one typical example of which is disclosed in U.S. Pat. No. 3,601,674 entitled, "Control System For Firing SCR'S In Power Conversion Apparatus", issued to John A. Joslyn and Albert F. Koch on Aug. 24, 1971 and assigned to the assignee of the present invention. In this patent, a digital control system is disclosed for controlling the flow of power through thyristors from a polyphase AC source to a load. The system disclosed includes a firing circuit for each phase, wherein each firing circuit comprises a reversible counter and a digital comparator. Phase detection logic is incorporated which examines the three phases of the AC source to synchronously initiate a control interval for an appropriate rectifier by presetting a predetermined positive or negative digital number into a reversible counter associated with each phase. The reversible counter then counts down if the preset number is positive or up if the preset number is negative during the control interval. During counting, a digital speed error signal, derived from a previous comparison of a digital command with a digital feedback signal indicative of motor speed is continuously compared with the contents of the reversible counter by the digital comparator. When the error exceeds the contents of the reversible counter, a firing pulse is generated and supplied to a positively or negatively poled rectifier, firing the respective poled rectifier in accordance with the positive and negative number.

Still more recently a programmed digital computer has been employed to control the firing of the thyristors through a programmed interrupt operational procedure. Such a system has been described in two publications, first by R. D. Jackson and R. D. Weatherby entitled, "Direct Digital Control Of Thyristor Converters", in the *IFAC Symposium of Control and Power Electronics and Electrical Drives*, dated October, 1974 and secondly in a publication by F. Fallside and R. D. Jackson entitled, "Direct Digital Control of Thyristor Amplifiers" appearing in the *Proceedings of the Institution of Electrical Engineers-Control and Science*, Volume 116, No. 5, pp. 873–878, May, 1969.

SUMMARY OF THE INVENTION

It is therefore an object of the present invention to provide an improved system for controlling a polyphase power converter.

It is a further object to provide an improved system for synchronizing the operation of a polyphase power converter to the AC line voltages.

It is still a further object of the present invention to provide an improved system for controlling a phase-lock loop circuit for firing a thyristor bridge circuit of a power converter.

It is still another object to provide an improved system for controlling a phase-lock loop firing circuit of a power converter by the use of a reconstructed line-to-line voltage signal.

The foregoing and other objects are achieved in accordance with the present invention through the provision of a control system for a polyphase power converter employing a thyristor bridge wherein the firing of the bridge thyristors is synchronized to the AC line voltages of an AC source by generating a synchronizing pulse train from a composite waveform developed by summing at least one integrated line-to-line voltage containing commutation notches with a signal corresponding to at least one delta current which is derived from the difference of two phase currents and multiplied by a factor representative of the commutation inductance. The resulting composite waveform includes well defined zero crossovers from which are generated synchronizing pulses having a relatively high degree of stability for maintaining accurate phase-lock loop operation. Also, the composite waveform is adapted to provide control signals for enhancing stable and accurate commutation of the thyristor bridge as well as developing a safe commutating margin therefor.

BRIEF DESCRIPTION OF THE DRAWINGS

While the present invention is described in particularity in the claims annexed to and forming part of this specification, a better understanding of the invention can be had by reference to the following description taken in conjunction with the accompanying drawings in which:

DESCRIPTION OF THE PREFERRED EMBODIMENTS

Figure 1:
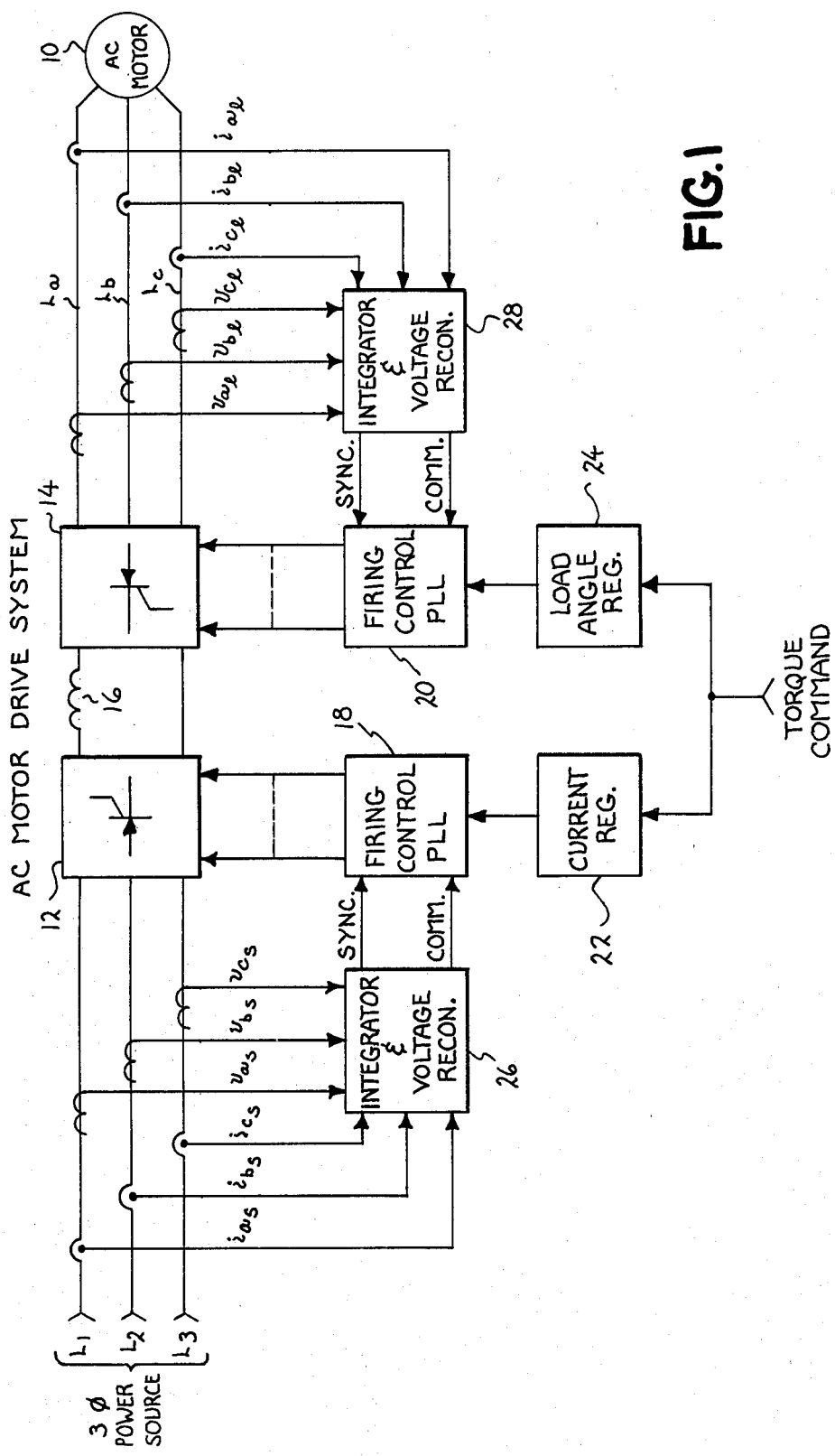
FIG. 1 is a major block diagram of an AC motor drive system incorporating the present invention.

In describing the overall operation of the invention, reference is now made to FIG. 1 which illustrates in major block diagram form an AC motor drive system for controlling an AC motor load 10 from a three phase ($3\phi$) power source coupled to line terminals $L_1$, $L_2$ and $L_3$ in accordance with the operation of a source side converter unit 12 and a load side converter or inverter 14. The source side converter unit 12 operates to convert the three phase AC power into a source of variable direct current (DC) which is coupled by way of a DC link circuit including an inductor 16 to the load side converter 14 which in turn operates to generate an AC current of variable magnitude and frequency which is supplied to the motor 10.

Both converters 12 and 14 are implemented by means of a well known phase controlled thyristor bridge whose conductivity is controlled by means of respective phase-lock loop (PLL) firing control circuits 18 and 20. The firing angles of the thyristors in converter 12 are primarily controlled by the output of a current regulator 22 while the firing angles of the thyristors in the converter 14 are primarily controlled by the output of a load angle regulator 24 both of which operate in response to a torque command signal generated in a well known manner. A typical example of the manner in which the torque command signal is generated is shown and described in U.S. Pat. No. 4,230,979 entitled, "Controlled Current Invertor and Motor Control System", issued to Paul M. Espelage, et al. on Oct. 28, 1980.

The firing of the thyristors in the two converters 12 and 14, moreover, is synchronized with the respective $3\phi$ line voltages $L_1$, $L_2$, $L_3$ and $L_a$, $L_b$, $L_c$ and typically utilize a waveform comprising the integration of the AC line-to-line voltage the zero crossings of which are used to form a synchronizing pulse train having a frequency six times the fundamental frequency, i.e. the line voltage frequency of $L_1$, $L_2$ and $L_3$. The phase-locked firing control circuits 18 and 20 are preferably of the digital type, a typical example of which is shown and described in U.S. Pat. No. 4,263,557 entitled, "Power Converter Control" issued to W. B. Jarvinen on Apr. 21, 1981, and which further includes interrupt data processing techniques taught for example in the aforementioned publications as well as U.S. Pat. No. 4,201,936, entitled, "Motor Speed Regulator And Control System", issued to P. J. Roumanis on May 6, 1980, and U.S. Pat. No. 4,290,001 entitled, "Closed Loop Microcomputer Controlled Pulse Width Modulated Inverter-Induction Machine Drive System", by Paul M. Espelage, issued Sept. 15, 1981, the latter two inventions also being assigned to the assignee of this invention.

Accordingly, the phase-lock loop firing control circuit 18 for the source side converter 12 is synchronized to the AC power of the three phase lines $L_1$, $L_2$ and $L_3$ by means of a circuit 26 which embodies the subject invention while the load side converter 14 has its thyristor firing synchronized to the line voltages appearing on AC power lines $L_a$, $L_b$ and $L_c$ by means of a second circuit 28 which is substantially identical to the circuit 26.

Synchronization is accomplished in accordance with the subject invention by sensing the appropriate line voltages and currents, i.e. $V_{as}$, $V_{bs}$, $V_{cs}$ and $i_{as}$, $i_{bs}$ and $i_{cs}$ for the source side converter 12 and $v_{a1}$, $v_{b1}$, and $v_{c1}$ and $i_{a1}$, $i_{b1}$, $i_{c1}$ for the load side converter 14 and then utilizing these signals to develop a control waveform from which synchronizing pulses, at least, are generated without the deleterious effect previously encountered when utilizing integrated line-to-line voltages which are corrupted by commutation notches. As was noted with respect to the prior art, the problem has heretofore been overcome by superimposing; i.e. summing, two waveforms to provide a composite or reconstructed waveform which in effect fills in the commutation notches prior to being passed through a 90° filter or integrator, whereupon the zero crossings of the reconstructed waveform are thereafter sensed and used as reference signals for phase-lock loops. In the prior art, a reconstructed line-to-line voltage involves the summation of the line-to-line voltage with a signal corresponding to a differentiation of a fictitious "delta" current multiplied by the commutation inductance. Such a reconstruction is illustrated by the set of waveforms shown in FIG. 5. The waveforms of FIG. 5 are furthermore intended to illustrate the operation of a load side converter, e.g. converter 14 of FIG. 1, connected to a motor load operating at approximately full load and wherein thyristors are typically fired at an angle 150°.

Figure 5:
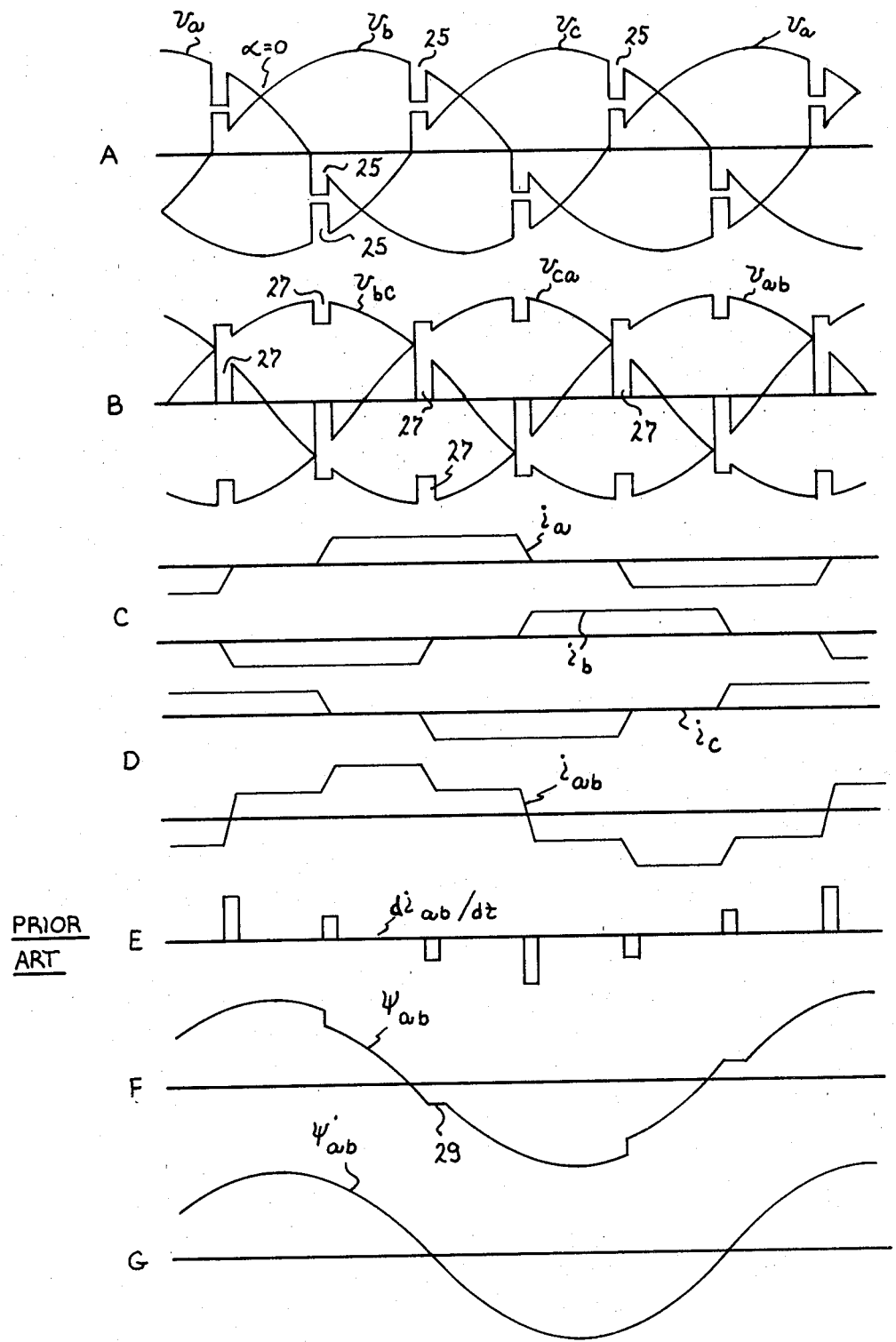
FIG. 5 is a set of time related waveforms typically illustrative of prior art practice.

Waveforms A of FIG. 5 are illustrative of the three phase voltages $v_a$, $v_b$, $v_c$ whose relative phases are 120° apart. Each of the phase voltage waveforms includes abrupt discontinuities or commutation notches 25 as shown for firing angles of 150°, where $\alpha=0°$ is noted to be at the respective phase voltage cross-over points. The waveforms B on the other hand, are illustrative of the line-to-line voltages whose waveforms $v_{ab}$, $v_{bc}$ and $v_{ca}$ also include commutation notches 27 located at the same points in time as the notches 25 in the waveforms of the phase voltages $v_a$, $v_b$ and $v_c$. With reference to the waveforms C, shown therein are waveforms for the commutated line currents $i_a$, $i_b$ and $i_c$ for the phases a, b and c, while the waveform D is illustrative of one "delta" current waveform $i_{ab}$ derived from the phase currents $i_a$ and $i_b$ in a manner to be described. A differentiation (d/dt) of the $i_{ab}$ delta current is shown by waveform E. Next, waveform F is illustrative of a pseudo flux waveform $\Psi_{ab}$ which results from an integration ($\int v_{ab}\, dt$) of the line-to-line voltage waveform $v_{ab}$. As shown, the flux wave $\Psi_{ab}$ is irregular and tends to have flat spots 29 in the waveform in the region of the zero crossover which results from the position of the commutation notches 27 of the waveform $v_{ab}$. Noting, however, that the waveform E of the differentiated delta current $i_{ab}$ occurs at the commutation notches, they in effect are used to fill in the notches 27 in the line-to-line voltage (waveforms B) prior to integration which results in a reconstructed flux wave $\Psi'_{ab}$ being generated as shown in waveform G of FIG. 5. Such a waveform is substantially smooth with zero crossovers which are essentially devoid of flat spots.

Figure 2:
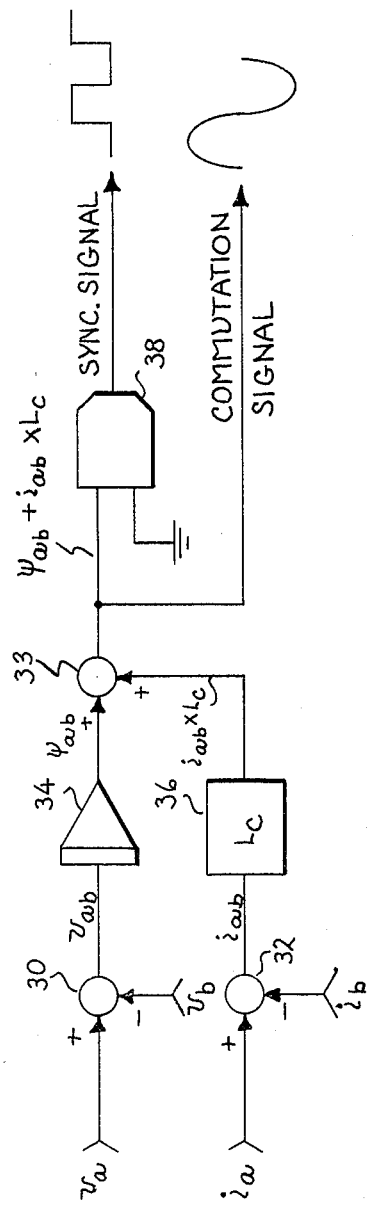
FIG. 2 is a simplified block diagram illustrative of the inventive concept of the present invention.

In the present invention, however, the differentiation heretofore employed is eliminated and a synchronizing signal for thyristor firing is developed from a waveform resulting from the summation of at least one integrated line-to-line voltage with a signal corresponding to a "delta" current scaled; i.e. multiplied, by a factor representative of the commutation inductance. The preferred embodiment of the subject invention in its simplest form is shown in FIG. 2. There $v_a$ and $v_b$ represent two of the $3\phi$ voltages $v_a$, $v_b$ and $v_c$ referenced to neutral while $i_a$ and $i_b$ represent the two line currents for the phases a and b. A line-to-line voltage $v_{ab}$ is developed by differencing the phase voltages $v_a$ and $v_b$ at a summing point 30 while a "delta" current $i_{ab}$ is developed by differencing the line currents $i_a$ and $i_b$ in a summing junction 32. The "delta" current is derived from the line currents $i_a$, $i_b$ and $i_c$ from the relationship:

$$i_{ab}=i_a-i_b$$

Figure 6:
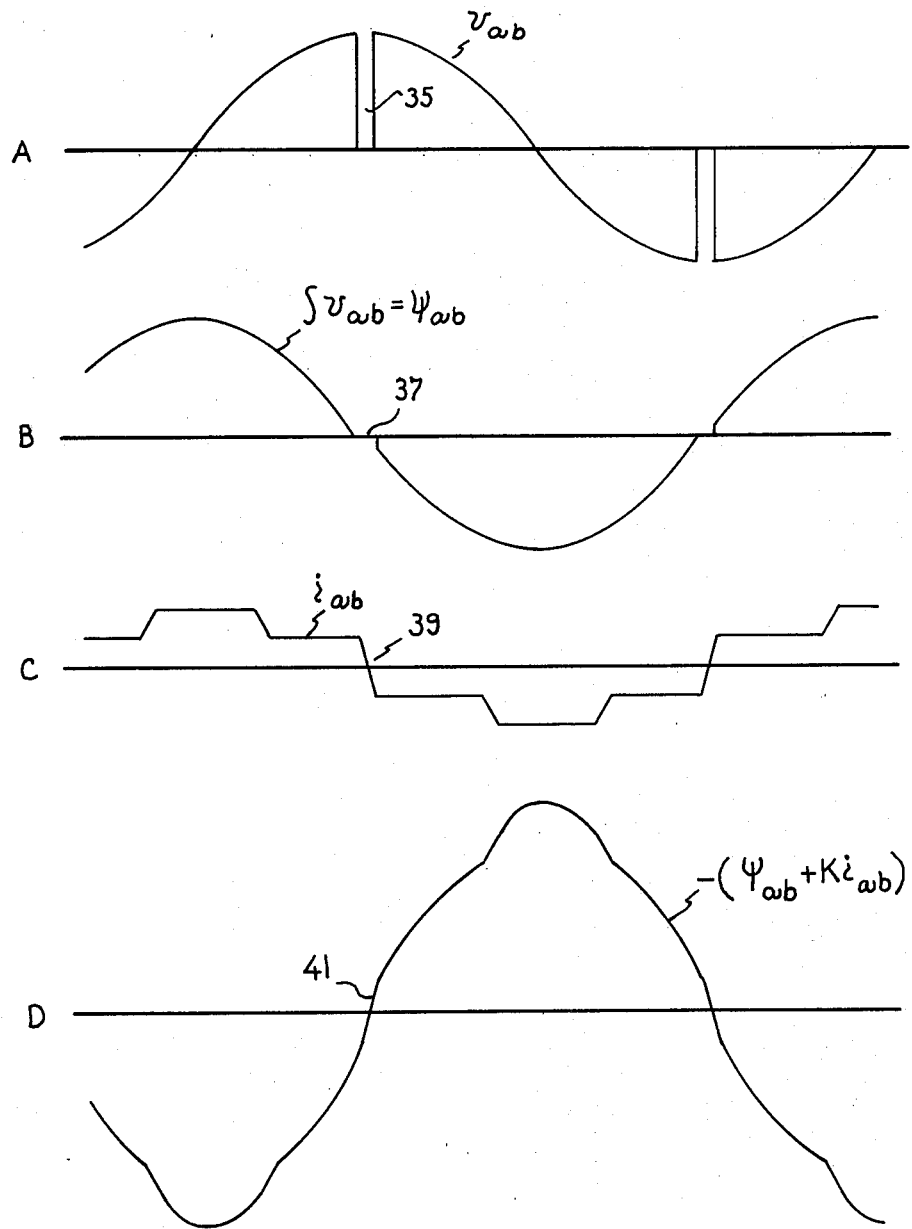
FIG. 6 is a set of time related waveforms helpful in understanding the subject invention.

The line-to-line voltage $v_{ab}$ is furnished to a signal integrator 34 whose output corresponds to a pseudo flux wave $\Psi_{ab}$ particularly when referenced to the stator, not shown, of an AC motor load being supplied, for example, by a load side converter; e.g. converter 14 of FIG. 1 but which also applies to source line converter 12. The flux wave $\Psi_{ab}$ is applied to a summing point 33 along with a "delta" current $i_{ab}$ which has been multiplied, by the appropriately scaled commutation inductance $L_c$ (block 36). Such an implementation is well known to those skilled in the art. The output of the summing junction 33 comprises a generally sinusoidal waveform having well defined zero crossings notwithstanding the occurrence of commutation notches in the line-to-line voltages as mentioned earlier. To illustrate this, reference is now made to the waveforms of FIG. 6. Waveform A of FIG. 6 is representative of one of the line-to-line voltages, namely $v_{ab}$, which includes a commutation notch 35 at substantially 90°. Waveform B, on the other hand, is illustrative of the integrated line-to-line voltage $v_{ab}$ which corresponds to a pseudo flux waveform $\Psi_{ab}$. Although a 90° phase shift results from the integration, the position of commutation notch remains fixed and appears as a flat spot 37 at the zero crossover region and as such constitutes a possible source of error for synchronizing thyristor firing. However, by observing waveform C which is illustrative of the waveform corresponding to the "delta" current $i_{ab}$, it can be seen that a relatively steep linear current transition 39 occurs at the zero cross-over commutation notch. Accordingly by making a composite waveform of waveforms B and C such as by summing the two, a waveform having an abrupt zero cross-over 41 at the commutation notch is provided as shown by waveform D. For clarity waveform D is shown non-sinusoidal by over compensating the contribution from the $Lxi_{ab}$ term. Such a waveform finds utility not only for generating synchronizing pulses for a phase-lock loop controlling the firing of a thyristor power converter, but is also useful in controlling commutation thereof because the waveform is expressed in units of volt-seconds.

Figure 3:
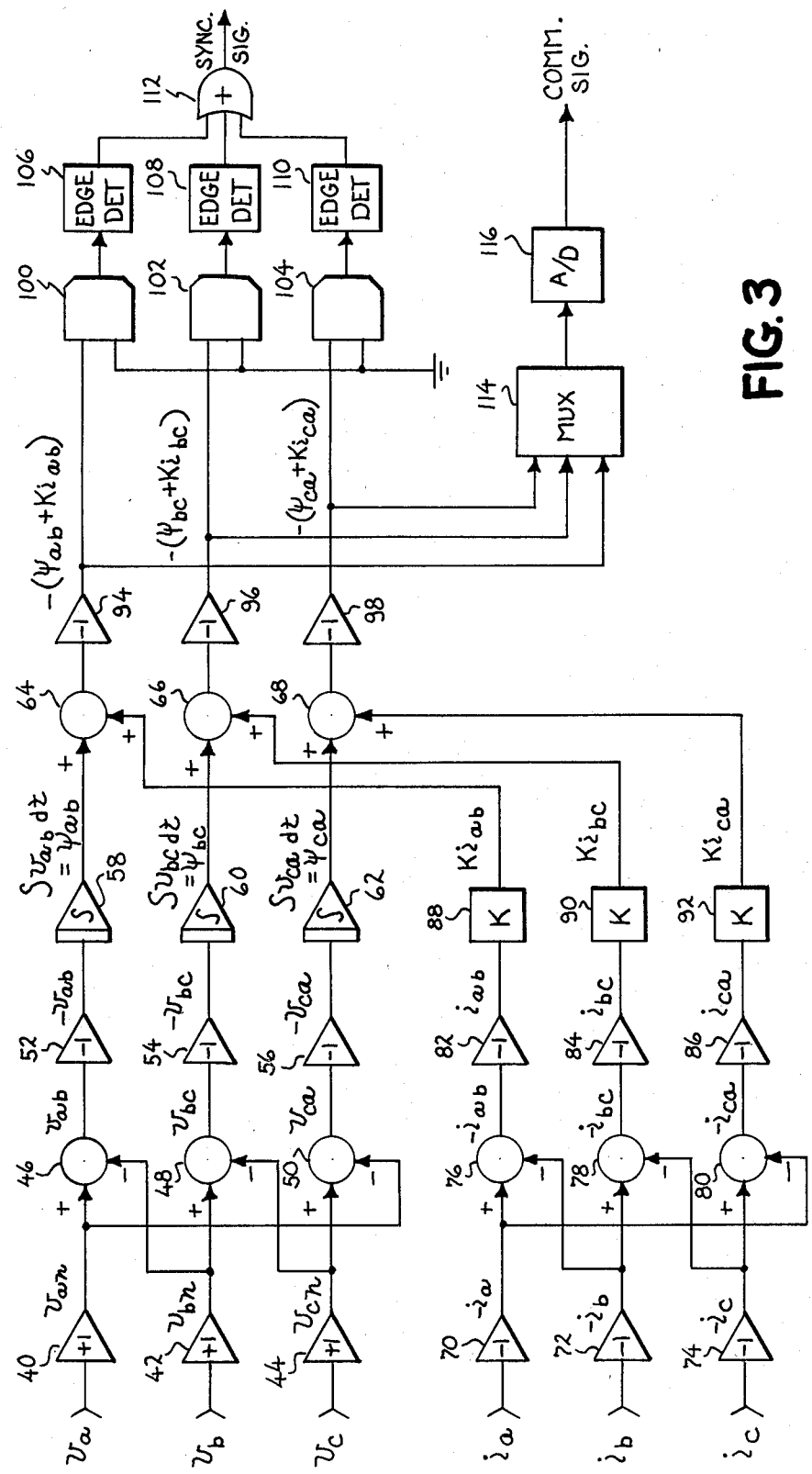
FIG. 3 is an electrical block diagram illustrative of the preferred embodiment of the subject invention.

Referring now to FIG. 3, the electrical block diagram there shown is a more detailed 3$\phi$ version of the basic implementation of the subject invention shown in FIG. 2. As shown, the phase voltages $v_a$, $v_b$ and $v_c$ which represent the phase voltages for a source or load side converter are applied to respective unity gain buffer amplifiers 40, 42 and 44 whose outputs correspond to the phase to neutral voltages $v_{an}$, $v_{bn}$ and $v_{cn}$. These three phase to neutral voltages are applied to the (+) terminals of respective summing points 46, 48 and 50 from which line-to-line voltages $v_{ab}$, $v_{bc}$ and $v_{ca}$ are developed by applying the phase voltage $v_{bn}$ to the (−) terminal of the summing point 46, the phase to neutral voltage $v_{cn}$ to the (−) terminal of summing point 48 and phase to neutral voltage $v_{an}$ to the (−) terminal of summing point 50.

The three line-to-line voltages $v_{ab}$, $v_{bc}$ and $v_{ca}$ thus developed are coupled to respective inverter amplifiers 52, 54 and 56, the respective outputs of which are supplied to integrators 58, 60 and 62 which also perform a signal inversion to provide three pseudo flux waveforms $\Psi_{ab}$, $\Psi_{bc}$ and $\Psi_{ca}$. These flux waveforms are, respectively, applied to the (+) terminals of summing junctions 64, 66 and 68 along with scaled delta current signals $Ki_{ab}$, $Ki_{bc}$ and $Ki_{ca}$ which correspond to signals representative of the product of the respective delta currents and the system commutation inductance. These last three signals are developed from the line phase currents $i_a$, $i_b$ and $i_c$ by being first applied to inverting amplifiers 70, 72 and 74 whose inverted outputs ($-i_a$, $-i_b$ and $-i_c$) are coupled to the (+) terminals of summing points 76, 78 and 80. Inverted delta currents $-i_{ab}$, $-i_{bc}$ and $-i_{ca}$ are generated by connecting the phase currents $-i_b$, $-i_c$ and $-i_a$ respectively to the (−) terminals of the summing junctions 76, 78 and 80. The inverted delta currents from the summing points 76, 78 and 80 are applied to inverting amplifiers 82, 84 and 86 whose outputs correspond to noninverted delta currents $i_{ab}$, $i_{bc}$ and $i_{ca}$. A scaling factor K is applied to each of the delta currents by means of the scaling circuits 88, 90 and 92 which respectively implement the required transfer function for the system commutating inductance. Accordingly, the scaled delta currents and the integrated line-to-line voltages which correspond to flux waves are combined to form composite waveforms $\Psi_{ab}+Ki_{ab}$, $\Psi_{bc}+Ki_{bc}$ and $\Psi_{ca}+Ki_{ca}$. These waveforms are fed to respective inverting amplifiers 94, 96 and 98 and provide output waves like waveform D of FIG. 6 and are shown in their mutually phased relationship by the waveforms A, B and C of FIG. 7. As noted, these waveforms do not include flat spots in the region of their respective zero crossings.

Figure 7:
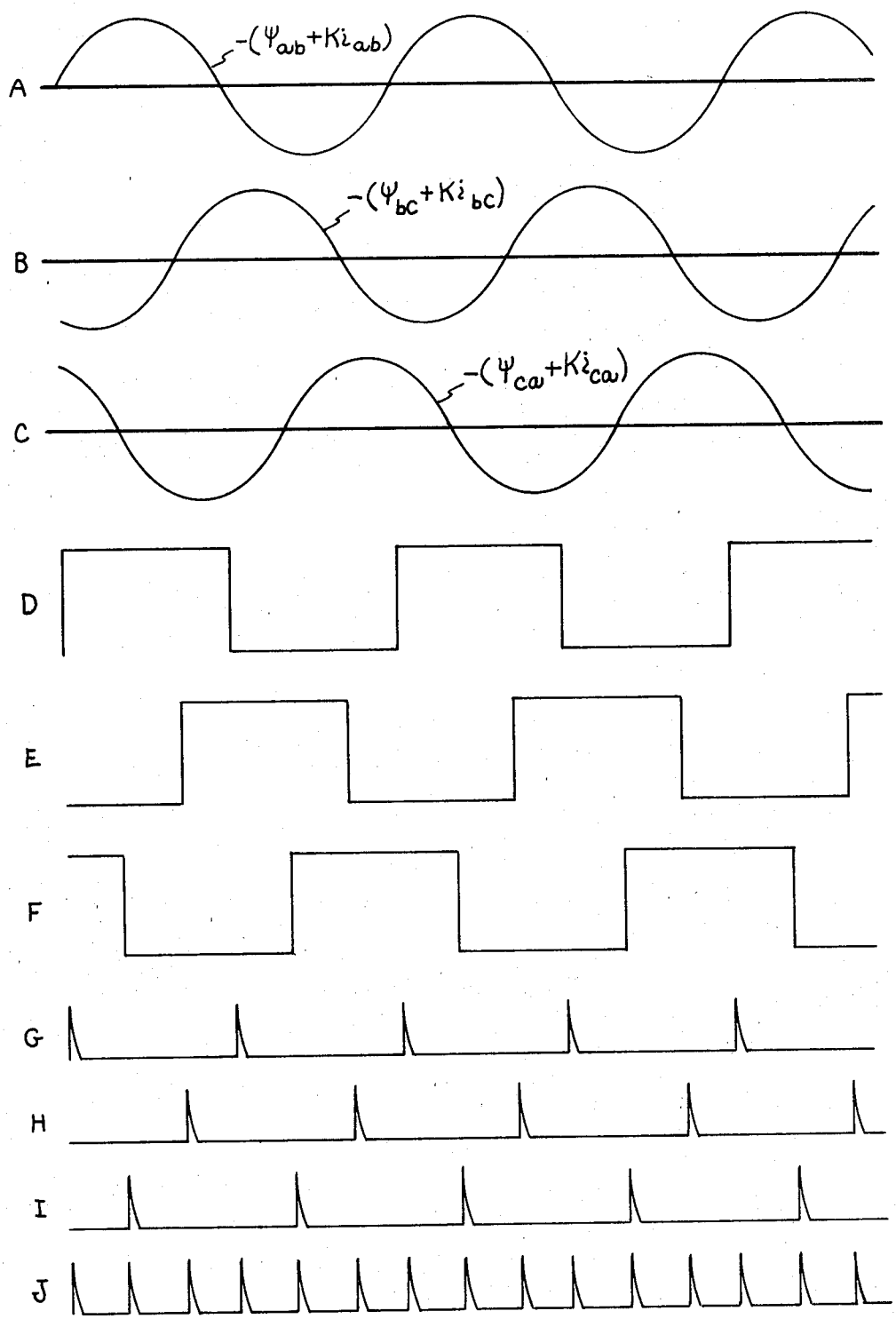
FIG. 7 is another set of time related waveforms illustrative of the operation of the embodiment of the subject invention shown in FIG. 3.

Accordingly, by coupling these composite signals to comparator circuits 100, 102 and 104 (FIG. 3) which are referenced to ground potential, they operate as zero crossing detectors to provide square wave outputs corresponding to waveforms D, E and F of FIG. 7. By coupling the square wave outputs from the comparators 100, 102 and 104 to respective edge detectors 106, 108 and 110, pulse outputs as shown by waveforms G, H and I of FIG. 7 are provided which when fed to an OR circuit 112, provides a pulse output train such as shown by waveform J.

The waveform signals A, B and C of FIG. 7 which appear at the output of the inverting amplifiers 94, 96 and 98 of FIG. 3 are also adapted to be used in the control of commutation, particularly where the firing control phase-lock loops 18 and 20 (FIG. 1) are digitally implemented. Accordingly, the outputs of amplifiers 94 and 96 and 98 are shown coupled to a signal multiplexer 114 where they are applied to an analog to digital converter 116 whereupon this signal along with the synchronizing pulses outputted from the OR circuit 112 are coupled to the phase lock loops 18 and 20 of FIG. 1.

Figure 4:
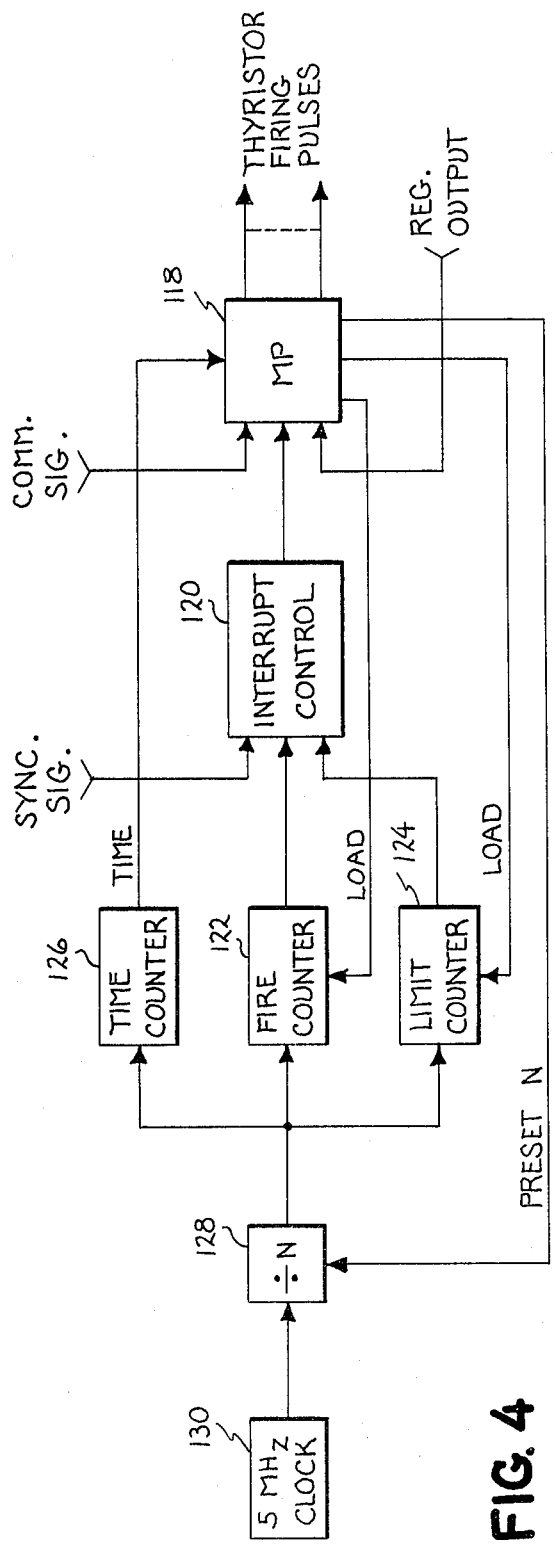
FIG. 4 is a block diagram of a portion of a digital phase-lock loop firing control circuit utilized in the system shown in FIG. 1.

Referring now to FIG. 4 there is disclosed in block diagram form the pertinent portions of a digital implementation of the firing control circuits 18 and 20. Shown therein is a microprocessor 118 which comprises, for example, a suitably programmed Intel 8086 microcomputer or the like which is adapted to operate in accordance with self-contained interrupt programs under the control of an interrupt control circuit 120 in a manner as typically disclosed in the aforementioned related art. The interrupt control circuit 120, which comprises for example an integrated circuit chip, is furnished the synchronizing signal pulse train (waveform J of FIG. 7) along with the output from a fire counter circuit 122 and a limit counter 124. These counters are comprised of down-counters which are loaded with calculated values from the microprocessor 118. The microprocessor in addition to receiving interrupt commands from the control chip 120, receives the "commutation signal" provided by the A/D converter 116 (FIG. 3). A firing angle control signal comprising the output of the current regulator 22 or the load angle regulator 24 depending upon whether it is used in connection with the source converter 12 or the load side converter 14 is either provided to the microprocessor or internally generated in the microprocessor. In addition to these inputs, the microprocessor also receives as an input a "time" signal from a counter 126 which is coupled to a ($\div$N) phase-lock loop counter 128 coupled to a system clock 130 which, for example, generates a 5 MHz clock pulse train.

In operation, the six times fundamental frequency pulse train comprising the synchronizing signal is provided to the interrupt control chip 120 which in turn enables a zero crossing interrupt program which reads the time from the counter 126. At the instant of the zero cross-over signified by each synchronizing pulse, the correct reading of the time counter 126 is known. If the actual reading is different from the correct reading, it determines that the phase-lock loop is not in synchronization. The error is then furnished to a phase-lock loop correction program which comprises another interrupt program called by the zero crossing program. The output of the phase-lock loop correction program is fed back to the phase-lock loop counter 128 as a "preset N" signal which changes the division factor ($\div$N) until the error is reduced to zero. With the phase-lock loop thus synchronized, the appropriate regulator output signal causes the microprocessor 118 to calculate a particular firing angle for a thyristor bridge (not shown) included in the converter. Simultaneously the time counter 126 is again read to determine the present angle and the difference between this and the desired firing angle is loaded as a number into the fire counter 122 which counts down to zero whereupon another interrupt is initiated to fire a particular thyristor. This sequence repeats for all of the complete thyristor bridge. Thus, the reconstructed flux waves provide the system with signals which control the timing of thyristor firings in accordance with the zero crossings of the respective three phase line voltages.

As noted, the reconstructed flux waves $\Psi_{ab} + Ki_{ab}$, etc. have units of volt-seconds and accordingly when the commutation signal is supplied the microprocessor 118 a weighted average of the past six peak amplitudes is computed from which a quantity corresponding to the commutated inductance multiplied by the delta current is subtracted from this peak. This calculation is then utilized along with the output from the current or load angle regulator to generate the desired firing angle. This value is also adapted to provide a control of a safe commutation margin, particularly as it relates to the load side converter 14 inasmuch as a synchronous motor is operated at a leading power factor and the power factor should be as close to unity as safe commutation margin will allow.

Figure 8:
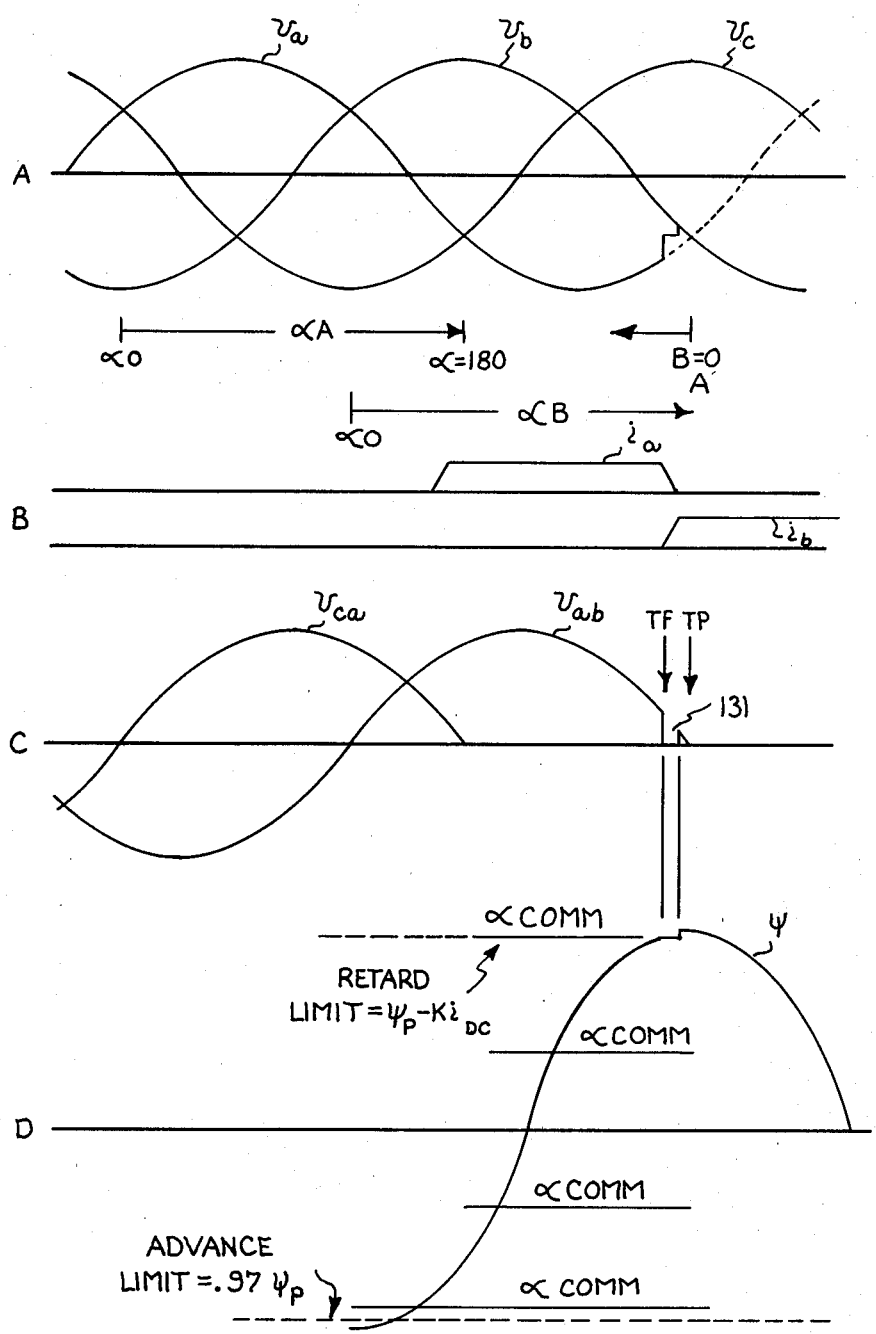
FIG. 8 is a set of time related waveforms further illustrative of the operation of the subject invention.

As shown by the waveforms in FIG. 8, commutation of the line current $i_a$ to line current $i_b$ occurs as shown by the waveform set B wherein the three phase voltages $v_a$, $v_b$ and $v_c$ are shown by the set of waveforms A. The line-to-line voltages $v_{ab}$ and $v_{ca}$ are shown in the waveform set C while waveform D comprises integrated line-to-line voltage of $v_{ab}$. The retard limit is shown to be equal to $\Psi_P - Ki_{DC}$ wherein $\Psi_P$ is equal to the peak value of the flux wave and $i_{DC}$ is equal to the current in the DC link; i.e. inductor 16 of FIG. 1, while the advance limit is equal to 0.97 $\Psi_P$. These limits are necessary in order that the commutation interval takes place prior to the crossings of phase voltages e.g. $v_a$ and $v_b$ as indicated by the waveforms of A. As shown, the commutation notch 131 appears in the waveform $v_{ab}$ of waveforms C at the retard limit point TF with TP indicating the phase voltage cross-over point.

Thus what has been shown and described is an improvement in phase lock loop control of a thyristor type power converter circuit which utilizes a reconstructed integrated line-to-line voltage signal for the primary feedback control signal where the deleterious effect of the commutation notches occurring in the integrated signal waveform is eliminated.

While there has been shown and described what is at present considered to be the preferred embodiment of the present invention, modifications thereto will readily occur to those skilled in the art. It is not desired, therefore, that the invention be limited to the specific circuit arrangement shown and described, but it is intended to cover all such modifications, alterations and changes falling within the true spirit and scope of the invention as defined in the appended claims.

I claim:

1. A method of generating a control signal for controlling a synchronization and commutation of thyristor firing circuitry included in a phase-locked electrical power converter coupled to a polyphase AC power line, comprising the steps of:
   (a) deriving at least one voltage signal representing the line-to-line voltage on said AC power line;
   (b) deriving at least one delta current signal indicative of the current in a phase of said AC power line;
   (c) generating a pseudo flux signal waveform from said voltage signal;
   (d) providing an electrical analog of the commutation inductance of said power converter and generating a product signal corresponding to the product of said delta current signal and said analog of the commutation inductance;
   (e) combining said pseudo flux signal waveform with said product signal to provide a composite signal therefrom;
   (f) thereafter generating said control signal from said composite signal; and
   (g) applying said control signal to said thyristor firing circuitry of said power converter.

2. The method of claim 1 wherein said power converter comprises an AC converter coupled to a polyphase AC source via said power line.

3. The method of claim 1 wherein said power converter comprises a DC converter coupled to an AC load via said power line.

4. The method as defined by claim 1 whereby said step (a) of deriving at least one line-to-line voltage signal comprises the step of sensing at least two phase voltages of said polyphase AC source and thereafter differencing said phase voltages to provide said line-to-line voltage signal.

5. The method as defined by claim 4 wherein said phase voltages corresponds the phase to neutral voltages of said AC power line.

6. The method as defined by claim 1 wherein said step (b) of deriving at least one delta current signal comprises sensing at least two phase currents of said AC power line and differencing said two phase currents to provide said delta current signal.

7. The method as defined by claim 1 wherein said step (c) of generating said pseudo flux signal waveform comprises integrating said line-to-line voltage signal.

8. The method as defined by claim 1 wherein said step (d) of generating said product signal comprises scaling said delta current signal by a factor corresponding to the analog of the commutation inductance.

9. The method as defined by claim 1 wherein said step (d) of generating said product signal comprises multiplying said delta current signal by a factor corresponding to the analog of the commutation inductance.

10. The method as defined by claim 1 wherein said step (e) of combining comprises summing said pseudo flux signal and said product signal.

11. The method as defined by claim 1 wherein said step (f) of generating said control signal comprises sensing the zero crossings of said composite signal and then generating pulse signals at the zero crossings of said composite signal, said pulse signals being applied to phase locked loop circuit means coupled to said power converter for synchronizing the operation of said thyristor firing circuitry to said at least one voltage signal.

12. The method of claim 1 wherein said step (f) of generating said control signal comprises applying said composite signal to commutation control means included in said thyristor firing control circuitry for determining appropriate firing angles.

13. The method as dfined by claim 1 wherein said power converter comprises at least one of two interlinked power converters for driving an AC motor load, and
   wherein said step (f) of generating said control signal comprises determining the zero crossings of said composite signal and generating synchronization pulses therefrom in timed relationship with said zero crossings, said synchronization pulses being thereafter utilized to synchronize said thyristor firing circuitry with the mutual crossings of selected phase voltages of said AC source.

14. The method as defined by claim 13 wherein said step (f) additionally comprises applying said composite signal to said thyristor firing circuitry for determining the proper firing angle for a thyristor bridge included in said power converter.

15. The method as defined by claim 14 wherein said at least one power converter comprises a load side converter which operates to feed AC power to said motor load and wherein said step (f) additionally comprises applying said composite signal to said thyristor firing circuitry of said load side converter for determining a safe commutation margin for firing a thyristor bridge which operates to feed current to said motor load.

16. The method as defined by claim 14 wherein said step of determining the proper firing angle for commutating said power converter includes the step of determining a weighted average of multiple successive composite signals.

17. Apparatus for generating a signal adapted to synchronize the firing of thyristors in a phase-locked power converter having a commutation inductance associated therewith and coupled to a polyphase AC power line comprising in combination:
   (a) means providing at least one signal representing the line-to-line voltage on said power line;
   (b) means for sensing the phase currents of said power line and providing at least one signal corresponding to the difference of two of said phase currents to provide a delta current signal;
   (c) means for integrating said at least one signal representing the line-to-line voltage on said power line to provide a flux wave signal;
   (d) means for scaling said delta current signal by a predetermined factor to provide a signal corresponding to the delta current signal multiplied by said commutation inductance;
   (e) means for combining said flux wave signal with said scaled delta current signal to provide a composite signal substantially devoid of commutation notches while having substantially abrupt zero crossings;
   (f) a phase lock loop for controlling the firing of said thyristors in said power converter; and
   (g) means for applying said composite signal to said phase-lock loop.

18. The apparatus as defined by claim 17 wherein said means (g) for applying said composite signal includes (i) means for sensing the zero crossing of said composite signal and (ii) means responsive to said zero crossings of said composite signal to generate and couple synchronizing signals to said phase-lock loop for synchronizing the firing of said thyristors of said converter with the line-to-line voltage.

19. The apparatus as defined by claim 18 wherein said means (g) for applying said composite signal additionally includes (iii) means for conditioning said composite signal to control the commutation of current in said thyristors in said power converter.

20. Apparatus as defined by claim 17 wherein said power converter comprises one or both converters of a polyphase AC power supply system including a source side phase-controlled thyristor bridge converter and a load side phase-controlled thyristor bridge converter coupled together by means of a DC link circuit and operable to supply a load with an AC current of variable magnitude and frequency.

21. The apparatus as defined by claim 20 wherein said load comprises an AC motor.

22. The apparatus as defined by claim 20 wherein said power converter comprises the load side converter and said load comprises an AC motor coupled to said converter via said polyphase line.

23. The apparatus as defined by claim 20 and wherein said means (a) for providing said at least one signal representing the line-to-line voltage includes (i) means for sensing at least two phase voltages of said polyphase power line and (ii) means for differencing said two phase voltages to provide said line-to-line voltage 24. The apparatus as defined by claim 23 wherein said converter comprises the source side converter and wherein said means for sensing said phase voltages comprises means for sensing at least two phase voltages of a three phase power source coupled to said load side converter.

25. The apparatus as defined by claim 23 wherein said one converter comprises the load side converter and said load comprises a polyphase AC motor and wherein said means for sensing said phase voltages comprises means for sensing the back electromotive force voltages of said AC motor in response to phase currents fed to said motor from said load side converter.

26. The apparatus as defined by claim 20 and wherein said means (e) for combining comprises summing circuit means coupled to said means for integrating said at least one signal representing the line-to-line voltage and said means for scaling said delta current signal to provide said signal corresponding to the delta current signal multiplied by said commutation inductance.

27. The apparatus as defined by claim 26 wherein said polyphase AC supply system comprises a three phase system and,
   wherein said means (a) providing at least one signal representing the line-to-line voltage comprises means for providing three signals representing the respective three phase line-to-line voltages;
   wherein said means (b) for sensing the phase currents comprises means for sensing each of the three phase line currents and generating three delta current signals therefrom;
   wherein said means (c) for integrating at least one signal comprises means for integrating respective line-to-line voltages to provide three flux wave signals of the three phase line-to-line voltages;
   wherein said means (d) for scaling said delta current signal comprises means for scaling each of the three delta current signals to provide respective signals corresponding to each delta current signal multiplied by said commutation inductance;
   wherein said means (e) for combining comprises means for combining the three flux wave signals with respective scaled delta current signals to provide three composite signals; and
   wherein said means (f) for applying said composite signal comprises means for sensing zero cross-overs for each of the three composite signals and generating pulse signals corresponding to the respective zero cross-overs, and signal combiner means for combining all of the pulse signals into a unitary pulse train for synchronizing the firing of said thyristors to the line-to-line voltage.

28. The apparatus as defined by claim 27 and additionally including means responsive to said three composite signals for controlling commutation of said thyristors.

29. The apparatus as defined by claim 28 and additionally including means for combining said three composite signals and generating a control signal for establishing a safe commutation margin for the firing of said thyristors.

30. The apparatus as defined by claim 29 wherein said thyristors are connected in a bridge circuit arrangement.

* * * * *